United States Patent Office 3,186,967
Patented June 1, 1965

3,186,967
METHOD OF PREPARING HIGH MOLECULAR WEIGHT ORGANOSILOXANE POLYMERS
Siegfried Nitzsche, Rudolf Riedle, and Karl-Heinz Wegehaupt, all of Burghausen, Bavaria, Germany, assignors to Wacker-Chemie G.m.b.H., Bavaria, Germany
No Drawing. Filed Apr. 4, 1962, Ser. No. 184,929
Claims priority, application Germany, Apr. 12, 1961, W 29,800
8 Claims. (Cl. 260—46.5)

This invention relates to a novel method for preparing high molecular weight organosiloxane copolymers having different types of units in each molecule.

It is known that silicone rubber exhibiting satisfactory physical properties can be produced from high molecular weight, essentially linear, diorganosiloxane polymers. Generally these polymers have molecular weights in the range of 100,000 to 2,000,000 and contain a minimum number of branchings. If a significant number of trifunctional polymeric units (e.g. $RSiO_{3/2}$ units) are present in the polymers, the resulting cured product will generally prove to be brittle, hard and too resinous in nature for use as an elastomer. Thus, high polymeric, essentially diorganosiloxane polymers having an organic substituent/silicon ratio in the range of 1.98/1 to 2.02/1 must be used for silicone rubber stocks.

The high molecular weight organosiloxane polymers employed as starting materials for silicone rubbers are prepared by relatively simple procedures employing various condensation agents when uniform starting materials are employed. A low molecular weight dimethylsiloxane polymer, e.g. $[(CH_3)_2SiO]_{3-5}$, can be condensed to a high molecular weight linear siloxane polymer employing strong acids, alkalies, certain salts, phosphorous-nitrogen compounds and other nitrogen compounds as catalysts. The polymers produced by these known methods can generally be classified as homopolymers.

To attain specific properties in silicone rubber, it is often necessary to prepare high molecular weight diorganosiloxane polymers wherein a variety of units having different organic substituents are present. Such polymers are classified as copolymers. These copolymers must exhibit high molecular weight and must be essentially linear (i.e. free of branching in the chains). It has been proposed to cohydrolyze mixtures of the corresponding organosiloxanes to produce low molecular weight organosiloxane copolymers and thereafter to prepare the high molecular weight copolymers by known methods from the low molecular copolymers. On investigating this method, however, it was found that some organic groups are split off by the action of the acids, alkalies or other condensation agents employed as additives or produced during the reaction. Even when the cleavage of organic groups is reduced to a minor percentage, the copolymers so produced cannot be employed in the preparation of silicone rubbers. The known methods of polymerization, though useful in the preparation of homopolymers, produce either relatively low molecular weight oils of a few thousand cs. viscosity, at 25° C. or resinous materials when applied to the production of copolymeric organosiloxanes.

Another proposed method for preparing high polymeric weight organosiloxane copolymers consists of equilibrating mixtures of low molecular weight polysiloxanes (particularly cyclic diorganosiloxanes). It has been found, however, that organopolysiloxanes having different organic substituents are not miscible with each other in many cases. Vigorous equilibration of a mixture of immiscible organosiloxane polymers in accordance with known procedures results in cleaving organic radicals from some of the silicon atoms, thus producing a copolymeric product unsuited for use in preparing silicone rubber. On the other hand, a slow, cautious equilibration under mild conditions may avoid cleavage of organic substituents but the result of such an equilibration is separate condensation of the individual siloxane components emulsified in each other and no copolymerization occurs.

Another method suggested for preparing the desired organosiloxane copolymers consists of equilibrating mixtures of low molecular weight siloxanes in organic solvents. This method has proved to be unsatisfactory because the solvents are very difficult to remove from the high molecular weight siloxane copolymers. Generally the solvent equilibration is carried forward employing alkaline condensation agents. The alkaline catalysts are also very difficult to remove from the high polymer. The traces of alkaline catalyst remaining in the high polymer lead to significant deterioration of the thermal and electrical properties of any silicone rubber prepared therefrom unless laborious and costly steps are taken to remove the last traces of such catalyst from the high polymer. The removal of the solvents and alkaline catalyst from the high polymer is costly in time and money and is sufficiently difficult and uncertain to be a production problem for the entire industry.

It is the object of this invention to introduce a novel method for preparing organosiloxane copolymers of high molecular weight. The preparation of copolymeric organosiloxane gums for use in silicone rubber stocks is also an object of this invention. Other objects and advantages of this invention are detailed in or will be apparent from the disclosure and claims following.

This invention consists of a method of preparing high molecular weight organosiloxane copolymers by equilibrating the individual, immiscible siloxane starting materials in stages, employing a phosphorous-nitrogen compound as the catalytic tagent and adding in stepwise fashion the siloxane exhibiting the faster condensation rate to the siloxane exhibiting the slower condensation rate, thus effecting a stepwise equilibration to produce copolymers of any predetermined and desired composition.

It is known that different organosiloxanes exhibit different rates of condensation. The stepwise addition of the siloxane having the faster rate of condensation to the siloxane having the slower rate of condensation and the parallel stepwise equilibration makes it possible to avoid the formation of high molecluar weight homopolymers of the rapidly condensing siloxane before a uniform distribution of the individual units has taken place. At the same time, it is possible to limit the chain length and adjust the average molecular weight of the final copolymeric product by introducing triorganosilyl units which act as chain terminating units in the copolymeric reaction mass. The triorganosilyl units also prevent the condensation from proceeding too far in the early stages of the stepwise equilibration and thus insure that the equilibration reaction is not overtaken and replaced by the condensation reaction.

It was further discovered that the stepwise equilibration method of this invention not only permits the preparation of copolymers heretofore diffcultly prepared but it also greatly reduces the time required for equilibrating and condensing diorganosiloxanes. Thus this process is simpler and more economical than the heretofore known equilibration methods. Thus the yield of useable high polymer obtainable from the equipment employed can be significantly improved employing this method.

The low molecular weight organosiloxanes employed in starting materials herein are polymers wherein at least 98 mol percent of the units are of the formula $R_2SiO$ and up to 2 mol percent of the units are of the formulae $RSiO_{3/2}$ and $R_3SiO_{1/2}$. These starting materials have viscosities up to 10,000 cs. at 25° C. The organic substituents bonded to silicon by C—Si bonding and represented by R can be alkyl, halogenoalkyl, alkenyl, aryl, aralkyl, alkaryl and haloaryl radicals such as methyl, ethyl, propyl, butyl, cyclohexyl, cyclobutyl, nonyl, octadecyl, chloromethyl, 3,3,3-trifluoropropyl, vinyl, allyl, octadecenyl, phenyl, biphenyl, phenylethyl, methylphenyl, chlorophenyl, bromoxenyl and fluorophenyl radicals. Particularly significant as organic substituents herein are the methyl, ethyl, phenyl and vinyl radicals as found in such siloxane polymers as dimethylsiloxanes, diethylsiloxanes, phenylmethylsiloxanes, phenylethylsiloxanes, phenylvinylsiloxanes and methylvinylsiloxanes.

The condensation catalysts employed herein are phosphorous-nitrogen compounds selected from phosphoronitrile halides and certain organo nitrogen derivatives of phosphorous acid and phosphoric acid. The phosphoronitrile halides employed are preferably the polymeric chlorides represented by the formula $(PNCl_2)_n$ where $n$ is an integer of at least 3. Preferred are those compounds wherein $n$ is 3, 4, 5 or 6 and the commercially available phosphoronitrile chlorides are usually mixtures of such species.

The organo nitrogen derivatives of phosphorous or phosphoric acid employed herein are represented by the formulae

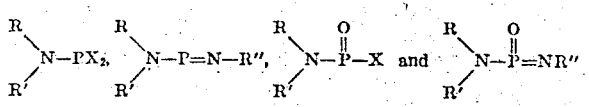

In these formulae R and R′ are monovalent substitutents selected from alkyl, aryl, alkaryl and aralkyl radicals and hydrogen atoms, at least one of the substituents R and R′ being one of the defined organic radicals. R″ is an alkyl, aryl, alkaryl or aralkyl radical, and X is a halogen atom, preferably chlorine or bromine.

The following compounds are representative of the preferred organic phosphorous-nitrogen compounds:

Phosphorous acid-dichloride anilide
$$C_6H_5—NH—PCl_2$$

Phosphorous acid-dichloride-methyl-anilide
$$C_6H_5—N(CH_3)—PCl_2$$

Phosphorous acid-dichloride-ethyl-anilide
$$C_6H_5—N(C_2H_5)—PCl_2$$

Phosphorous acid-dichloride-diphenylamide
$$(C_6H_5)_2N—PCl_2$$

Phosphorous acid-dichloride-methylamide
$$CH_3—NH—PCl_2$$

Phosphorous acid-dichloride-isopropylamide
$$(CH_3)_2CH—NH—PCl_2$$

Phosphorous acid-dichloride-benzylamide
$$C_6H_5—CH_2—NH—PCl_2$$

Phosphorous acid-anilide-anile
$$[C_6H_5—N=P—NH—C_6H_5]_2$$

Phosphorous acid-methylamide-anile
$$C_6H_5—N=P—NH—CH_3$$

Phosphoric acid-dichloride-anilide
$$C_6H_5—NH—POCl_2$$

Phosphoric acid-dichloride-α-naphthylamide
$$C_{10}H_7NH—POCl_2$$

Phosphoric acid-dichloride-methylamide
$$CH_3NH—POCl_2$$

Phosphoric acid-dichloride-isopropylamide
$$(CH_3)_2CHNH—POCl_2$$

Phosphoric acid-dichloride-ethylamide
$$C_2H_5NH—POCl_2$$

Phosphoric acid-anilide-anile
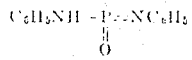

Phosphoric acid α-naphthylamide-anile
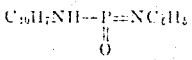

Phosphoric acid-methylamide-anile
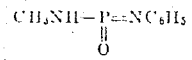

Phosphoric acid-isopropylamide-anile
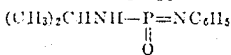

The phosphorous-nitrogen compound is employed in catalytic quantities with excellent results achieved employing .001 to 1.0 percent by weight of the phosphorous-nitrogen compound based on the weight of siloxane reactants employed.

The copolymerization reaction can be carried forward at room temperature or even below room temperature but the rate of reaction will be exceedingly low. Thus it is preferred to carry out the reaction at temperatures in the range of 40°–120° C. and the most preferred reaction temperatures are in the range 70°–90° C. The pressures at which reaction can be carried forward vary from subatmospheric to superatmospheric and atmospheric pressure is preferred. The reaction pressure is not critical.

In the preferred embodiment, the siloxane (A) having the slower rate of condensation is charged to the reaction vessel with the catalyst and solvent to be employed. The siloxane (B) having the more rapid rate of condensation is added stepwise to the reaction vessel with the initial portion of siloxane (B) being from 0.25 to 2.0 times the quantity of siloxane (A) charged to the vessel. The initial quantity of siloxane (B) added will depend upon the difference between the reaction rates of the equilibration and the condensation reactions. The faster siloxane (B) condenses to form high polymers in comparison to siloxane (A), the smaller the proportion of siloxane (B) employed in each step must be. In general, the initial addition of siloxane (B) should be about 0.5 times the initial charge of siloxane (A) in the reaction vessel. After each addition of siloxane (B) the reaction mixture is stirred and heated until a clear, homogeneous reaction mass is obtained evidencing a complete equilibration has occurred. This stepwise procedure has a reaction time which is the sum of all the individual steps and is much less than the time required for the reaction when the entire mass of siloxane (B) is added at one time to siloxane (A) and the equilibration and condensation is carried forward to completion. Of course, it is frequently found that the equilibration will not occur at all when the two siloxanes are admixed in a single step reaction.

The following examples are included herein to aid those skilled in the art to obtain a clear understanding of this invention. The scope of the invention is delineated in the claims and is not limited by the examples. All parts and percentages in the examples are based on weight, all viscosities are measured at 25° C. and all temperatures are in degrees centigrade unless otherwise stated.

EXAMPLE 1

A mixture of 20 g. of phenylmethylpolysiloxane (A) with a viscosity of 1050 cs., 5 g. dimethylpolysiloxane (B) with a viscosity of 2,000 cs. and 0.3 g. of a trimethylsilyl endblocked dimethylsiloxane with 12 silicon units (Si–12) was mixed with 0.1 ml. of a 50 percent solution of $(PNCl_2)_4$ in methylene chloride at a temperature of 80°–85° while stirring thoroughly. After the original white-turbid mixture had cleared another 5 g. of the same dimethylpolysiloxane were added, which again effected a white turbidity. Other additions of dimethylpolysiloxane followed after the previous mixture had cleared. Table I gives the time in which the equilibration runs off, detailed after the individual additions. The velocity of the reaction and the ratio of phenyl:methyl groups follow from the refractory indices. The end product was a highly viscous transparent polymer which was suitable for preparing silicone rubber.

*Table I*

| Addition of siloxane B, 2,000 cs. | Composition of mixture | | Equilibration time in minutes | Refractive index of the mixture composition |
|---|---|---|---|---|
| | Siloxane A, 1,050 cs. | Siloxane B, 2,000 cs. | | |
| G. | G. | G. | | |
| | 20 | | | 1.5092 |
| 5 | 20 | 5 | 45 | 1.5146 |
| 5 | 20 | 10 | 30 | 1.4960 |
| 5 | 20 | 15 | 20 | 1.4868 |
| 5 | 20 | 20 | 10 | 1.4790 |
| 10 | 20 | 30 | 10 | 1.4698 |
| 10 | 20 | 40 | 5 | 1.4523 |
| 10 | 20 | 50 | 5 | 1.4413 |
| 10 | 20 | 60 | 3 | 1.4383 |
| 30 | 20 | 90 | 5 | 1.4318 |
| 30 | 20 | 120 | 5 | 1.4258 |

Equilibration time in minutes: 2 hours+18 minutes.

EXAMPLE 2

A mixture of the same components of Example 1 of 20 g. phenylmethylpolysiloxane (A), 10 g. of dimethylpolysiloxane (B) and 0.3 g. "Si-12" was equilibrated and condensed as in Example 1. Table II gives the quantities of dimethylpolysiloxane added stepwise and the corresponding equilibration time. As in Example 1 the end product was a highly viscous polymer, suitable for preparing silicone rubber.

*Table II*

| Addition of siloxane B, 2,000 cs. | Composition of mixture | | Equilibration time[1] in minutes |
|---|---|---|---|
| | Siloxane A, 1,050 cs. | Siloxane B, 2,000 cs. | |
| G. | G. | G. | |
| | 20 | | |
| 10 | 20 | 10 | 90 |
| 10 | 20 | 20 | 45 |
| 20 | 20 | 40 | 40 |
| 20 | 20 | 60 | 30 |
| 60 | 20 | 120 | 20 |

[1] 3 hrs.+45 minutes

EXAMPLE 3

A mixture of the same components as in Example 1 of 20 g. phenylmethylpolysiloxane (A), 40 g. dimethylpolysiloxane (B) and 0.3 g. "Si-12" was equilibrated and condensed stepwise as in Example 1. Table III gives the quantities of dimethylpolysiloxane added stepwise and the corresponding equilibration times. The end product is like that of Example 1.

*Table III*

| Addition of siloxane B, 2,000 cs. | Composition of mixture | | Equilibration time[1] in minutes |
|---|---|---|---|
| | Siloxane A, 1,050 cs. | Siloxane B, 2,000 cs. | |
| G. | G. | G. | |
| | 20 | | |
| 40 | 20 | 40 | 410 |
| 40 | 20 | 80 | 330 |
| 40 | 20 | 120 | 20 |

[1] 12 hrs.+40 minutes.

EXAMPLE 4

A mixture of the same components of Example 1 of 20 g. phenylmethylpolysiloxane, 120 g. dimethylpolysiloxane and 0.3 g. "Si-12" is mixed with 0.1 ml. of a 50 percent solution of $(PNCl_2)_4$ in methylene chloride at a temperature of 80°–85° and kept there while stirring constantly. The milky mixture will first clear after 28 hours. The end product is like that of Example 1.

EXAMPLE 5

A mixture of 20 g. phenylmethylpolysiloxane (A) with a viscosity of 5,000 cs., 5 g. of dimethylpolysiloxane (B) with a viscosity of 10,000 cs. and 0.1 g. of a sym.-diphenyldivinyldimethyldisiloxane ("Si-12") is equilibrated and condensed stepwise under the same conditions as Example 1. Table IV gives the quantities of dimethylpolysiloxane added stepwise and the corresponding equilibration times. The end product is a high viscosity, transparent polymer suitable for the preparation of silicone rubber.

*Table IV*

| Addition of siloxane B, 10,000 cs. | Composition of mixture | | Equilibration time[1] in minutes |
|---|---|---|---|
| | Siloxane A, 5,000 cs. | Siloxane B, 10,000 cs. | |
| G. | G. | G. | |
| | 20 | | |
| 5 | 20 | 5 | 80 |
| 5 | 20 | 10 | 50 |
| 5 | 20 | 15 | 35 |
| 5 | 20 | 20 | 25 |
| 10 | 20 | 30 | 15 |
| 10 | 20 | 40 | 10 |
| 10 | 20 | 50 | 10 |
| 10 | 20 | 60 | 5 |
| 30 | 20 | 90 | 5 |
| 30 | 20 | 120 | 5 |

[1] 4 hours.

EXAMPLE 6

A mixture of the components of Example 5 of 20 g. phenylmethylpolysiloxane, 120 g. dimethylpolysiloxane and 0.1 g. "Si-12" is mixed with 0.1 g. of the previously used $(PNCl_2)_4$ solution at 80°–85° and kept there while stirring constantly. The turbid mixture had not cleared after 64 hours of reaction time.

EXAMPLE 7

A mixture of 20 g. vinylmethylpolysiloxane (C) with a viscosity of 6,000 cs., 10 g. of dimethylpolysiloxane (B) with a viscosity of 12,000 cs. and 0.1 g. "Si-12" is mixed with 0.1 ml. of the $(PNCl_2)_4$ solution at a temperature of 45°–50° while stirring well. The turbid mixture will clear after 20 minutes. Further quantities of dimethylpolysiloxane added and the corresponding equilibration times may be taken from Table V. The end product is a high viscosity transparent polymer, suitable for preparing silicone rubber.

*Table V*

| Addition of siloxane B, 12,000 cs. | Composition of mixture | | Equilibration time[1] in minutes |
|---|---|---|---|
| | Siloxane C, 6,000 cs. | Siloxane B, 12,000 cs. | |
| G. | G. | G. | |
| | 20 | | |
| 10 | 20 | 10 | 20 |
| 10 | 20 | 20 | 10 |
| 20 | 20 | 40 | 5 |
| 20 | 20 | 60 | 5 |

[1] 40 minutes.

EXAMPLE 8

A mixture of 20 g. phenylethylpolysiloxane (D) with a viscosity of 500 cs., 5 g. of dimethylpolysiloxane (B) with a viscosity of 1,050 cs. and 0.3 g. "Si-12" is mixed with 0.1 g. of the ordinary $(PNCl_2)_4$ solution at 80°–85° while stirring well. The milky-turbid mixture clears after 40 minutes. Further quantities of the same dimethylpolysiloxane added stepwise and the corresponding equilibration times may be taken from Table VI. The equilibrated and condensed end product is a transparent, highly viscous polymer, suitable for preparing silicone rubber.

Table VI

| Addition of siloxane B, 1,050 cs. | Composition of mixture | | Equilibration time¹ in minutes |
|---|---|---|---|
| | Siloxane D, 500 cs. | Siloxane B, 1,050 cs. | |
| G. | G. | G. | |
| | 20 | | |
| 5 | 20 | 5 | 40 |
| 5 | 20 | 10 | 30 |
| 5 | 20 | 15 | 25 |
| 10 | 20 | 25 | 30 |
| 15 | 20 | 40 | 25 |
| 20 | 20 | 60 | 20 |
| 30 | 20 | 90 | 10 |
| 30 | 20 | 120 | 5 |

¹ 3 hrs. and 5 min.

EXAMPLE 9

A mixture of the components of Example 8 of 20 g. phenylethylpolysiloxane, 120 g. dimethylpolysiloxane and 0.3 g. "Si-12" is mixed with 0.1 g. of the common (PNCl₂)₄ solution at a temperature of 80°–85° and stirred constantly. The milky-turbid mixture will clear only after 50 hours. The end product is like that of Example 8.

That which is claimed is:

1. A method of preparing high molecular weight essentially linear diorganosiloxane copolymers suitable for the production of silicone rubber having an organic substituent/silicon ratio of from 1.98/1 to 2.02/1, on the average, and wherein the organic substituents bonded to silicon through Si—C linkages are selected from the group consisting of alkyl, halogenoalkyl, alkenyl, aralkyl, aryl, halogenoaryl, and alkaryl radicals consisting essentially of equilibrating at least two immiscible, low molecular weight, fluid diorganosiloxane polymers employing stepwise addition of (B) the low molecular weight siloxane polymer having the more rapid rate of condensation, having a viscosity up to 10,000 cs. at 25° C., containing at least 98 mol percent of diorganosiloxane units, any remaining units being selected from the group consisting of monoorganosiloxane units and triorganosiloxane units where each organic substituent is selected from the group consisting of alkyl, halogenoalkyl, alkenyl, aralkyl, aryl, halogenoaryl and alkaryl radicals, to (A) the low molecular weight siloxane polymer having the slower rate of condensation, having a viscosity up to 10,000 cs. at 25° C., containing at least 98 mol percent of diorganosiloxane units, any remaining units being selected from the group consisting of monoorganosiloxane units and triorganosiloxane units where each organic substituent is selected from the group consisting of alkyl, halogenoalkyl, alkenyl, aralkyl, aryl, halogenoaryl and alkaryl radicals, said siloxane (B) being added in successive steps in proportions of from 0.25 to 2.0 times the quantity of siloxane (A) present, the resulting mixture being equilibrated to form a homogeneous mass prior to further additions of siloxane (B), said equilibration being carried forward in the presence of .001 to 1 percent by weight based on the weight of siloxane polymer present of a phosphorous-nitrogen compound selected from the group consisting of

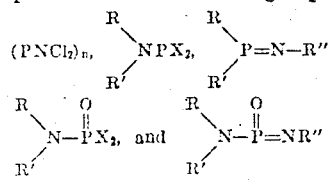

where n is an integer of at least 3, R and R' are selected from the group consisting of aryl, alkyl, alkaryl and aralkyl radicals and hydrogen, at least 1 of the substituents R and R' being one of the defined organic radicals, R" is a substituent selected from the group consisting of alkyl, aryl, aralkyl and alkaryl radicals and X is a halogen atom.

2. The method of claim 1 wherein the siloxane polymer (B) is a dimethylsiloxane polymer.

3. The method of claim 1 wherein the siloxane polymer (A) is selected from the group consisting of phenylmethylsiloxanes, vinylmethylsiloxanes and phenylethylsiloxanes.

4. The method of claim 1 wherein the equilibration is carried forward at a temperature in the range from room temperature to 120° C.

5. The method of claim 1 wherein the catalyst employed is a phosphoronitrile halide.

6. A method of preparing essentially linear, diorganosiloxane polymers of at least 100,000 cs. viscosity at 25° C., suitable for production of silicone rubber, having an average organic subsituent/silicon ratio in the range from 1.98/1.0 to 2.02/1.0, wherein the organic substituents are bonded to silicon through C—Si bonding and are selected from alkly radicals, halogenoalkyl radicals, aryl radicals, halogenoaryl radicals, alkenyl radicals, aralkyl radicals and alkaryl radicals, comprising contacting (A) at least one fluid, low molecular weight diorganosiloxane polymer having a viscosity up to 10,000 cs. at 25° C., containing at least 98 mol percent of diorganosiloxane units, any remaining units being selected from the group consisting of monoorganosiloxane units and triorganosiloxane units where each organic substituent is selected from the group consisting of alkyl, halogenoalkyl, alkenyl, aralkyl, aryl, halogenoaryl and alkaryl radicals, with (B) a fluid, low molecular weight diorganosiloxane polymer immiscible with (A) and having more rapid condensation rate than (A) and having a viscosity up to 10,000 cs. at 25° C., containing at least 98 mol percent of diorganosiloxane units, any remaining units being selected from the group consisting of monoorganosiloxane units and triorganosiloxane units where each organic substituent is selected from the group consisting of alkyl, halogenoalkyl, aralkyl, aryl, halogenoaryl and alkaryl radicals, in the presence of .001 to 1 percent by weight based on the weight of siloxane polymers present of a phosphorous nitrogen compound selected from compounds of the formulae

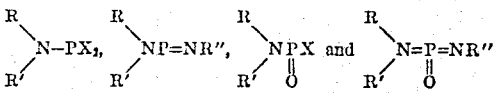

wherein n is at least 3, R and R' are selected from alkyl, aryl, alkaryl and aralkyl radicals and hydrogen, at least one of the substituents R and R' being one of the defined organic radicals, R" is selected from alkyl, aryl, aralkyl and alkaryl radicals and X is a halogen atom, said polymer (B) being added in stepwise fashion to said polymer (A), each of the stepwise additions of (B) being in an amount of from 0.25 to 2.0 times the quantity of the siloxane present, the resulting mixture being equilibrated to a homogeneous mass prior to further additions of siloxane (B).

7. The method of claim 6 wherein the siloxane polymer (B) is a dimethylsiloxane polymer.

8. The method of claim 7 wherein the siloxane polymer (A) is selected from the group consisting of phenylmethylsiloxane, vinylmethylsiloxane and phenylethylsiloxane.

References Cited by the Examiner
UNITED STATES PATENTS
2,830,967   4/58   Nitzsche et al. _____ 260—46.5

MURRAY TILLMAN, Primary Examiner.
LOUISE P. QUAST, Examiner.

UNITED STATES PATENT OFFICE
CERTIFICATE OF CORRECTION

Patent No. 3,186,967                          June 1, 1965

Siegfried Nitzsche et al.

It is hereby certified that error appears in the above numbered patent requiring correction and that the said Letters Patent should read as corrected below.

Column 6, Table IV, for the heading "Siloxane A, 5,00 cs." read -- Siloxane A, 5,000 cs. --; under the same heading, under "G." the dash should read -- 20 --.

Signed and sealed this 11th day of January 1966.

(SEAL)
Attest:

ERNEST W. SWIDER                                EDWARD J. BRENNER
Attesting Officer                                     Commissioner of Patents